(12) United States Patent
Mor et al.

(10) Patent No.: US 9,239,533 B2
(45) Date of Patent: Jan. 19, 2016

(54) ELECTROSTATIC INK COMPOSITION, INK CONTAINER, PRINTING APPARATUS AND PRINTING METHOD

(75) Inventors: Ilanit Mor, Nes Ziona (IL); Basile Verdene, Nes Ziona (IL); Albert Teishev, Nes Ziona (IL); Roi Liraz, Nes Ziona (IL); Yaron Grinwald, Nes Ziona (IL); Nava Klein, Nes Ziona (IL); Emad Masoud, Nes Ziona (IL)

(73) Assignee: Hewlett-Packard Indigo B.V., Maastricht (NL)

( * ) Notice: Subject to any disclaimer, the term of this patent is extended or adjusted under 35 U.S.C. 154(b) by 84 days.

(21) Appl. No.: 14/232,455

(22) PCT Filed: Jul. 13, 2011

(86) PCT No.: PCT/EP2011/062013
§ 371 (c)(1),
(2), (4) Date: Jan. 13, 2014

(87) PCT Pub. No.: WO2013/007307
PCT Pub. Date: Jan. 17, 2013

(65) Prior Publication Data
US 2014/0147171 A1  May 29, 2014

(51) Int. Cl.
*G03G 9/00* (2006.01)
*G03G 15/06* (2006.01)
*G03G 9/135* (2006.01)
*B41J 2/06* (2006.01)
*B41J 2/14* (2006.01)
*C09D 11/03* (2014.01)

(52) U.S. Cl.
CPC .............. *G03G 9/1355* (2013.01); *B41J 2/06* (2013.01); *B41J 2/14314* (2013.01); *C09D 11/03* (2013.01)

(58) Field of Classification Search
CPC .......... G03G 9/00; G03G 9/097; G03G 9/135
USPC ................. 430/112, 115, 108.1; 399/233
See application file for complete search history.

(56) References Cited

U.S. PATENT DOCUMENTS

| | | |
|---|---|---|
| 3,844,966 A | 10/1974 | Nelson |
| 4,059,444 A | 11/1977 | Lu et al. |
| 4,504,138 A | 3/1985 | Kuehnle et al. |
| 4,690,539 A | 9/1987 | Radulski et al. |
| 4,783,388 A | 11/1988 | El-Sayed et al. |
| 5,346,796 A | 9/1994 | Almog |
| 5,547,804 A * | 8/1996 | Nishizawa et al. ........... 430/114 |
| 5,749,032 A | 5/1998 | Landa et al. |
| 5,923,929 A | 7/1999 | Ben Avraham et al. |
| 7,736,828 B2 | 6/2010 | Regev et al. |
| 2009/0311614 A1 * | 12/2009 | Almog et al. ..................... 430/9 |

FOREIGN PATENT DOCUMENTS

| | | |
|---|---|---|
| CN | 1037596 | 11/1989 |
| CN | 101473275 | 7/2009 |
| JP | H07509074 | 10/1995 |
| JP | 2009536750 | 10/2009 |
| WO | 9631808 | 10/1996 |
| WO | 2007130069 | 11/2007 |

* cited by examiner

*Primary Examiner* — Thorl Chea
(74) *Attorney, Agent, or Firm* — Hewlett-Packard Patent Department (57) ABSTRACT

Disclosed is an electrostatic ink composition, comprising a single charge director and a charge control agent that counters the build up of negative optical density memory on the intermediate transfer member of a printing apparatus using the electrostatic ink.

15 Claims, 5 Drawing Sheets

ELECTROSTATIC INK COMPOSITION, INK CONTAINER, PRINTING APPARATUS AND PRINTING METHOD

FIELD OF THE INVENTION

The present invention relates to an electrostatic ink composition, an ink cartridge and printing apparatus including such an electro ink composition and a printing method using such an electrostatic ink composition.

BACKGROUND OF THE INVENTION

In many printing systems, it is common practice to develop a hardcopy of an image by using a photoconductive surface. The photoconductive surface is selectively charged with a latent electrostatic image having image and background areas. A liquid developer, i.e. an electrostatic ink, comprising charged toner particles in a carrier liquid is brought into contact with the selectively charged photoconductive surface. The charged toner particles adhere to the image areas of the latent image while the background areas remain clean.

Various techniques for electrostatic image transfer are known. One method includes the use of an intermediate transfer member. A liquid image, which includes a liquid carrier having ink particles dispersed therein, is transferred to a photoconductive member or drum and from there to a surface, e.g., a release layer or blanket, of the intermediate transfer member. The liquid image is electrostatically attracted from the photoconductive surface to the surface of the intermediate transfer member. The liquid carrier is removed from the surface of the intermediate transfer member and the ink particles are compacted on the surface in the image configuration. Thereafter, the ink particles are transferred from the surface of the intermediate transfer member to a substrate in the image configuration.

Modern liquid toner electrostatic imaging began with the invention of a new class of toners referred to as ElectroInk™. This type of toner is characterized by its toner particles being dispersed in a carrier liquid, where the toner particles include a core of a resin, i.e. a polymer, with fibrous extensions extending from the core. When the toner particles are dispersed in the carrier liquid in a low concentration, the particles remain separate. Although not intending to be bound by theory, when the toner develops an electrostatic image, the concentration of toner particles increases and the fibrous extensions interlock Typically the toner comprises a thermoplastic resin (polymer) as the basis for the toner particles (also referred to herein as ink particles), and a non-polar liquid as a carrier liquid in which the toner particles are dispersed. Generally, the toner particles contain a colorant such as a pigment. An example of such a toner can for instance be found in U.S. Pat. No. 5,923,929.

A charge director, also called charge control agent or imaging agent, is also added to the dispersion to induce charge on the particles. Many of the prior art charge directors are mixtures of several charge director components having different chemistries. An example of such a charge director is disclosed in U.S. Pat. No. 5,346,796 in which the liquid ink further comprises a non-quaternary amine salt soluble in the carrier liquid such as isopropylamine dodecylbenzenesulfonate to stabilize the electrical properties of the charge director.

A possible disadvantage of using a mixture of materials as charge director is the possibility of selective adsorption of certain charge director components onto the surface of the ink particles. This may lead to differential depletion of the components responsive to their affinity to the ink particles. Therefore, a non-controllable change in the charge director composition may be expected during continuous printing process. This may adversely affect the long term characteristics of the charge director and reflected in degraded print quality.

Such problems have been overcome by certain types of micelle-based charge directors such as the charge director disclosed in WO2007/130069 A1, which provide improved print quality compared to charge directors having multiple charge directing components. Such charge directors are sometimes referred to as single charge directors (SCD) because of the fact that the ink composition only comprises a single complex compound as a charge director.

It has been found by the present inventors that some charge directors comprising only a single charge component can cause negative optical density memory effects originating from the intermediate transfer member during high frequency printing of several types of images including most notably (monochrome) images. Negative optical density memory is a phenomenon whereby the optical density of solids measured on the substrate decreases along the printing process. In extreme cases, this can cause the appearance of holes in the ink layer observed on the substrate.

SUMMARY OF THE INVENTION

An aspect of some embodiments of the present invention is the provision of an electrostatic ink composition including a charge control agent for at least reducing the effects of negative optical density memory seen on the paper and originating from the incomplete transfer of ink between the photo imaging plate and the intermediate transfer member.

In an aspect of some embodiments of the present invention, the electrostatic ink composition further comprises a micelle-based charge director. In an aspect of some embodiments of the present invention, the micelle-based charge director comprises nanoparticles of a first salt and micelles of formula $MA_n$ enclosing said nanoparticles, wherein M is a metal, n is the valence of M and A is an organic ion.

In an aspect of some embodiments of the present invention the organic ion is an ion according to Formula 2:

wherein each of $R_1$ and $R_2$ is a substituted or unsubstituted alkyl group.

In an aspect of some embodiments of the present invention, the charge control agent is a charge control agent according to Formula 1:

wherein $R_1$ is a branched or unbranched $C_4$-$C_{18}$ alkyl group, $R_2$ is a cyclic, branched or unbranched $C_3$-$C_8$ alkyl group and $R_3$ and $R_4$ are selected from hydrogen and a cyclic, branched or unbranched $C_3$-$C_8$ alkyl group.

In an aspect of some embodiments of the present invention, a method for obtaining a printed substrate comprises charging a first medium in a pattern according to an image; applying an electrostatic ink including a charge control agent to said first medium such that said toner particles define said image; electrostatically transferring said image to an intermediate transfer member; and releasing the image from said intermediate transfer member onto the substrate.

BRIEF DESCRIPTION OF THE EMBODIMENTS

Embodiments of the invention are described in more detail and by way of non-limiting examples with reference to the accompanying drawings, wherein FIG. 1 schematically depicts a printing apparatus suitable for using an electrostatic ink composition according to some embodiments of the present invention.

DETAILED DESCRIPTION OF THE DRAWINGS

It should be understood that the Figures are merely schematic and are not drawn to scale. It should also be understood that the same reference numerals are used throughout the Figures to indicate the same or similar parts.

Figure 1:
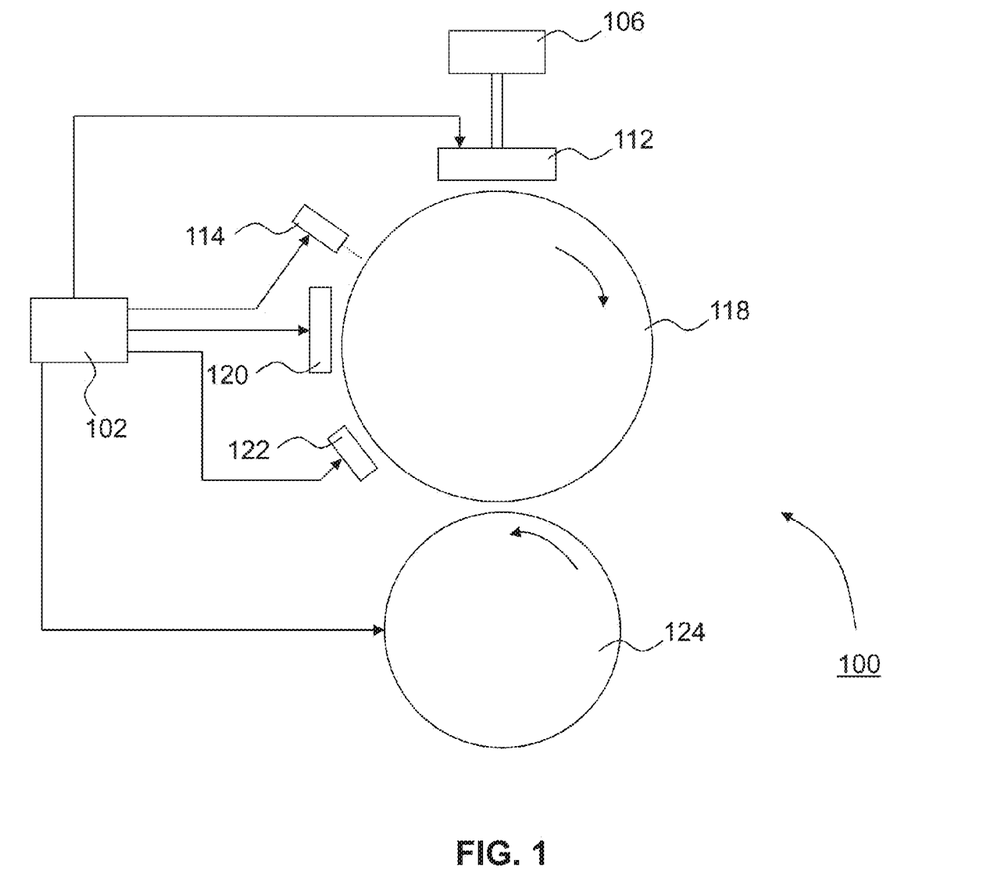

FIG. 1 schematically depicts a printing apparatus 100 suitable for use with electrostatic inks such as the ink according to some embodiments of the present invention. The printing apparatus 100 shown in FIG. 1 is purely schematic to illustrate that the invention can be performed on any liquid toner printer or copier. The electrostatic inks (which will also be referred to as toners) of the present invention can be applied to any system, which transfers toner to a final substrate by one color separation as well as to printing apparatuses which transfer all the separations to an intermediate transfer member and then transfer the group of separations to the final substrate together. Furthermore, the exact mode of development is not important to the practice of the invention, and development can be by binary (layer-wise) transfer of high concentration toner or by electrophoretic development using any of the methods known for bringing the toner into contact with a latent image.

Printing apparatus 100 comprises conventional components such as a photoreceptor imaging cylinder 118 having a photoreceptor attached or bonded to it and an axis about which the cylinder rotates and an intermediate transfer member 124 for transferring the developed image to a substrate, charger 120 and a laser unit 114 that provides a scanning laser beam for generating latent images on photoreceptor 118, a developer 112 for developing the latent images and optionally, a cleaning station 122 are positioned around the perimeter of photoreceptor 118. A printing apparatus provided with the elements described with respect to FIG. 1 is useful with toner or inks comprising charge director materials such as the charge collector material disclosed in WO 2007/130069 A1, which hereby is incorporated by reference in its entirety. The printing process implemented by such a printing apparatus 100 is sometimes referred to as liquid electroprinting.

Such a printing apparatus 100 may for instance be used in conjunction with toner compositions such as ElectroInk™. ElectroInk is a composite of resin and pigments where the pigments are the fillers in the resin composite. The colored resin composite particles are dispersed in a carrier liquid. In liquid electroprinting, the ink as adhered to the photoreceptor 118 is transferred onto the blanket of the intermediate transfer member 124 by electrophotography, after which the solid toner particles in the ink are fused into tacky film while extracting the carrier liquid by phase segregation, evaporating the carrier liquid and transferring the solid film using a release surface of the blanket to the media.

This process offers a great deal of benefits such as rapid fusing and drying of the wet image enable high print quality, and transferring a tacky dry image to the media from the hot intermediate transfer member 124 enables large variety of substrates (media gamut) to be used. After fusing of the hot melt resin in the printing process on the heated blanket, the resin of the composite toner particles serves as the binder of the developed image on the substrate.

A controller 102 is provided in the printing apparatus in order to issue commands to printing apparatus elements, receive data from printing apparatus elements, process printing apparatus element data, and/or to control printing apparatus operation, in an exemplary embodiment of the invention. Optionally, printing apparatus elements include writing parameter controlling elements, such as a developer 112 and/or a laser 114. Optionally, the printing apparatus includes reservoir tanks for storing printing materials, such as a toner reservoir 106. Further descriptions of such a printing apparatus may for instance be found in the patent applications U.S. Pat. No. 5,749,032, U.S. Pat. No. 4,504,138 and U.S. Pat. No. 4,690,539.

It has been found that for toners or inks having certain types of charge directors for imparting a charge on the toner particles such that they can adhere to the areas defining the latent image on the photoreceptor 118 can cause negative optical density memory effects originating from the incomplete transfer onto the intermediate transfer member 124, in particular when the printing apparatus 100 is used for printing monochrome or duochrome images at a high frequency. Without wishing to be bound by theory, it is believed that under such printing conditions a residual charge remains on the blanket of the intermediate transfer member 124, which screens the electric field in the transfer of a subsequent image from the photoreceptor 118 to the intermediate transfer member 124, thus preventing the complete transfer of the ink from the photoreceptor 118 to the intermediate transfer member 124. Due to the high printing frequency, there is insufficient time between two subsequent image transfers for this residual charge to dissipate, e.g. into the intermediate transfer member 124, which is believed to cause this electric field screening effect.

For instance, a particularly suitable single component charge director comprises nanoparticles of a first salt and micelles of formula $MA_n$ enclosing said nanoparticles, wherein M is a metal, n is the valence of M and A is an organic ion. The first salt preferably is a simple salt, i.e. a salt that does not form micelles by itself, although it may form a core for micelles with a micelle forming salt.

In an embodiment, the first salt has a cation selected from the group consisting of $Mg^{2+}$, $Ca^{2+}$, $Ba^{2+}$, $NH_4^+$, tert-butyl ammonium, $Li^+$, $Al^{3+}$ or any subgroup thereof, and an anion selected from the group consisting of $SO_4^{2-}$, $PO_4^{3-}$, $NO_3^-$, $HPO_4^{2-}$, $CO_3^{2-}$, acetate, trifluoroacetate, $Cl^-$, $Br^-$, $I^-$, $ClO_4^-$ and $TiO_3^{4-}$ or from any sub-group thereof.

In an embodiment, the first salt is selected from the group consisting of $CaCO_3$, $Ba_2TiO_3$, $Al_2(SO_4)_3$, $Al(NO_3)_3$, $Ca_3(PO_4)_2$, $BaSO_4$, $BaHPO_4$, $Ba_2(PO_4)_3$, $CaSO_4$, $(NH_4)_2SO_4$, $NH_4OAc$, Tert-butyl ammonium bromide, $NH_4NO_3$, LiTFA, $LiClO_4$ and combinations thereof.

In an embodiment, the first salt is selected from $BaSO_4$ and $BaHPO_4$. In another embodiment, the single component charge director further comprises basic barium petronate.

An embodiment of a suitable organic anion for the micelle-forming salt is a sulfosuccinate ion according to Formula 2:

$$R_1\text{—}O\text{—}C(O)CH_2CH(SO_3^-)C(O)\text{—}O\text{—}R_2 \qquad \text{Formula 2}$$

wherein each of $R_1$ and $R_2$ is an alkyl group, have been found to have a longer discharge time on the blanket of the intermediate transfer member 124 compared to multi-component charge directors for instance including lecithin, basic barium petronate and alkyl aryl sulfonate. It is noted that in the context of the present application, a single component charge director is a charge director comprising a single par- ticle type and composition, preferably a particle having a core of a first material surrounded by a micelle of a second material.

In an embodiment, the metal cation of the micelle-forming salt is selected from the group of metals consisting of Na, K, Cs, Ca and Ba, or any subgroup thereof.

In Formula 2, $R_1$ and $R_2$ may be selected from $C_6$-$C_{25}$ linear, branched or cyclic alkyl groups wherein the $C_6$-$C_{25}$ linear, branched or cyclic alkyl groups may be substituted with at least one functional group selected from F, Cl, Br, I, OH, $C_{1-6}$ alkoxy, $C_{1-6}$ alkyl sulfonate, $C_1$-$C_6$ fluorinated alkyl, $CF_3$ and $NO_2$. It is particularly advantageous if each of R1 and R2 comprise an alkyl group that has a linear chain of at least 8 carbon atoms.

In an embodiment, the single component charge director may further comprise a second micelle forming substance.

It has been found that the addition of a charge control agent of general Formula 1:

Formula 1 wherein $R_1$ is a branched or unbranched $C_4$-$C_{18}$ alkyl group and at least one of $R_2$ and $R_3$ is a cyclic, branched or unbranched $C_3$-$C_8$ alkyl group, to an electrostatic ink comprising such a single component charge director effectively reduces or even suppresses the occurrence of negative optical memory density effects on the blanket of the intermediate transfer member 124 of the printing apparatus 100.

Preferably, the amount of charge control agent is chosen in the range of 0.1-2% by total weight of the ink toner particles in the electrostatic ink composition. If the amount of charge control agent is lower than 0.1 wt %, negative optical density memory effects on the blanket may not be sufficiently suppressed. If the amount of charge control agent is higher than 2 wt %, the charge control agent may interfere with the normal printing process.

Particularly promising results have been obtained with alkylamine dodecylbenzenesulfonates although it is expected that the nature of $R_1$ in Formula 1 has only a limited effect on the blanket charge controlling properties of the charge controlling agent of Formula 1, i.e. it is expected that for alkyl groups other than a dodecyl group, similar effects are obtained.

It has been found that the alkyl group(s) in the aminium ion in Formula 1 may be advantageously selected from isopropyl, branched or unbranched butyl and cyclohexyl although it is expected that other alkyl groups may also be used. Preferably, $R_2$=isopropyl and $R_3$, $R_4$=H in Formula 1. More preferably, the charge controlling agent is an agent according to Formula 3:

Formula 3

In Formula 3, the alkyl chain of the sulfonyl anion is shown as a $C_{12}$ linear alkyl chain, but it should be understood that a mixture of sulfonyl anions having $C_{12}$-$C_{14}$ linear alkyl chains respectively is also feasible.

The further composition of the electrostatic ink is not limited to specific embodiments, as any suitable composition may be contemplated. For instance, the carrier liquid can include, but is not limited to, a low dielectric constant, non-polar liquid that is used as the medium for toner particles. The carrier liquid can usually include compounds that have a resistivity in excess of about $10^9$ ohm-cm and a dielectric constant below about 3.0; however, higher conductivities can be used as less preferred applications on presses or as working points in other applications.

The carrier liquid can include, but is not limited to, hydrocarbons, halogenated hydrocarbons, cyclic hydrocarbons, functionalized hydrocarbons, where functionalized can include alcohols, acids, esters, ethers, sulfonic acids, sulfonic acid esters, and the like. The hydrocarbon can include, but is not limited to, an aliphatic hydrocarbon, an isomerized aliphatic hydrocarbon, branched chain aliphatic hydrocarbons, aromatic hydrocarbons, and combinations thereof.

Illustrative carrier liquids include, but are not limited to, aliphatic hydrocarbon, isoparaffinic compounds, paraffinic compounds, dearomatized hydrocarbon compounds, and the like. In particular, the carrier liquids can include, but are not limited to, Isopar-G™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™, each sold by EXXON CORPORATION; Teclen N-16™, Teclen N-20u, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF4™, AF-S™, AF-6™ and AF7™, each sold by NIPPON OIL CORPORATION; IP Solvent 1620™ and IP Solvent 2028™, each sold by IDEMITSU PETROCHEMICAL CO., LTD.; Amsco OMS™ and Amsco 460™, each sold by AMERICAN MINERAL SPIRITS CORP.; and electron, positron, new II, purogen HF (100% synthetic terpenes) sold by ECOLINK. In an embodiment, the carrier liquid is about 55 to 99% by total weight of the ink toner particles.

Similarly, any suitable toner particles may be used. The toner particles can include, but is not limited to, thermoplastic toner resins. In particular, the resin can include, but is not limited to, ethylene acid copolymers; ethylene acrylic acid copolymers; methacrylic acid copolymers; ethylene vinyl acetate copolymers; copolymers of ethylene (80 to 99.9%), acrylic, or methacrylic acid (20 to 0.1%)/alkyl (C1 to C5) ester of methacrylic or acrylic acid (0.1 to 20%); polyethylene; polystyrene; isotactic polypropylene (crystalline); ethylene ethyl acrylate; polyesters; polyvinyl toluene; polyamides; styrene/butadiene copolymers; epoxy resins; acrylic resins (e.g., copolymer of acrylic or methacrylic acid and at least one alkyl ester of acrylic or methacrylic acid wherein alkyl is from 1 to about 20 carbon atoms, like methyl methacrylate (50 to 90%)/methacryltic acid (0 to 20%/ethylhexylacrylate (10 to 50%)); ethylene-acrylate terpolymers: ethylene-acrylic esters-maleic anhydride (MAH) or glycidyl methacrylate (GMA) terpolymers; low molecular weight ethylene-acrylic acid ionomers and combinations thereof.

In an embodiment, the resin can include the Nucrel family of resins, e.g., Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynell 2002, Bynell 2014, and Bynell 2020 as sold by E. I. du PONT; the Aclyn family of resins, e.g. Aaclyn 201, Aclyn 246, Aclyn 285, and Aclyn 295 and the Lotader family of resins, e.g. Lotader 2210, Lotader, 3430, and Lotader 8200 as sold by Arkema. In an embodiment, the resin is about 5% to 100% by total weight of the ink toner particles.

Colorants, when present, can include, but are not limited to, cyan colorants, magenta colorants, yellow colorants, violet colorants, orange colorants, green colorants colorants, black colorants, and combinations thereof. Colorants used in conjunction with ElectroInk® based systems are known in the art. In an embodiment, the pigment is about 0% to 80% by total weight of the ink toner particles.

The electrostatic ink may further comprise additional components such as any suitable charge adjuvant. The electrostatic ink and its components may be manufactured in any suitable manner, such as the method of producing a charge director as disclosed in WO 2007/130069 A1 and ink preparation methods as disclosed in WO 96/31808 A1 and U.S. Pat. No. 7,736,828. Wax particles may be added to improve the durability of the printed image as disclosed in U.S. Pat. No. 7,736,828.

Embodiments of the present invention will now be described in more detail with the aid of the following experimental examples. It should be understood that these examples are not intended to limit the scope of the present invention and that alternative embodiments and equivalents that will be readily contemplated by the skilled person based on the present disclosure in its entirety are also intended to be included.

EXPERIMENTAL EXAMPLE 1

Black ElectroInk™ 4.5 (commercially available from HP Indigo) was provided with as a single charge director (SCD) $BaHPO_4$ as the first salt and $BaTR_2$ as micelles. The formula of the $TR^-$ organic anion is shown below:

Such a SCD may for instance be prepared as disclosed in WO2007/130069A1. A typical experiment included performing a series of image impressions on a HP Indigo 7000 printer with a standard (Gemini) blanket using this ink and a negative optical density (NOD) signal defined as the optical density of a previous background area minus the optical density of a previous image was measured as a function of the impression number. The series of image impressions consisted of the following sequence. First, 50 copies consisting of spaced apart small cube-shaped images in a solid black and solid cyan color were printed (note that black and cyan are transferred to different areas of the printer blanket). After these copies, 10 prints were made of a completely black image covering the entire print surface of the paper. After a number of impressions, an amount of the charge control agent of Formula 3 (from hereon referred to as GT) was added to the ink after which a further series of image impressions was performed. This experiment has been repeated for different amounts of the charge control agent of Formula 3.

Figure 2:
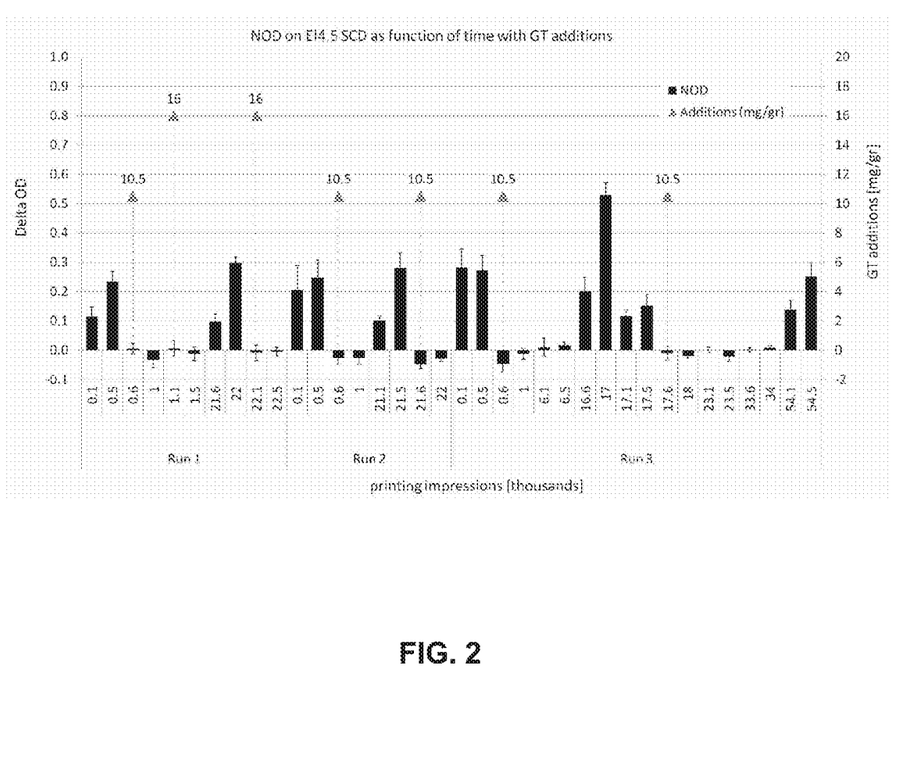
FIG. 2-5 depict various evaluation results of printing experiments using electrostatic ink compositions according to some embodiments of the present invention.

The results of these experiments are shown in FIG. 2. In FIG. 2, the results from the first series of image impressions without GT (labeled Run 1) show a distinct build-up of NOD after only a few hundred impressions, with the NOD signal subsequently remaining at a level of around 0.20. After additions of 1.05 g GT to the ink, corresponding to 10.5 mg/g toner particles and a subsequent addition of 1.6 g GT, the NOD signal is eliminated for 20,000 impressions. After the NOD signal has returned, an addition of 1.6 g GT immediately eliminates this NOD signal.

The second series of image impressions (labeled Run 2) also display a significant build-up of NOD signal after only a few hundred impressions. In this series, 1.05 g GT, corresponding to 10.5 mg/g toner particles was added, immediately leading to the disappearance of the NOD signal for at least 20,000 impressions.

The third series of image impressions (labeled Run 3) also display a significant build-up of NOD signal after only a few hundred impressions. In this series, 1.05 g GT, corresponding to 10.5 mg/g toner particles was added, immediately leading to the disappearance of the NOD signal for at least 15,000 impressions. Further additions of GT in each of these runs after the reappearance of NOD effects effectively eliminate the NOD effects for a further several thousands of printing impressions. This clearly demonstrates that the charge control agent of the present invention is capable of suppressing NOD effects originating from a transfer blanket for several thousands of printing impressions.

It is noted that for each of the impression runs the impact on the voltage DRV applied by the developer 112 after addition of the charge control compound was found to be minimal, thus demonstrating that the addition of GT does not affect the printing process on the photoreceptor imaging cylinder 118 of the printing apparatus 100.

EXPERIMENTAL EXAMPLE 2

In this experiment, the same experimental setup including the same ink and charge control agent as used in Experimental Example 1 was used. In this experiment, the NOD signal was measured for multiple image impressions series using an ink without GT at different bias voltages applied to the intermediate transfer member 124 (see FIG. 3, top pane) and for an ink including 0.8 g GT corresponding to 8 mg/g toner particles (see FIG. 3, bottom pane).

Figure 3:
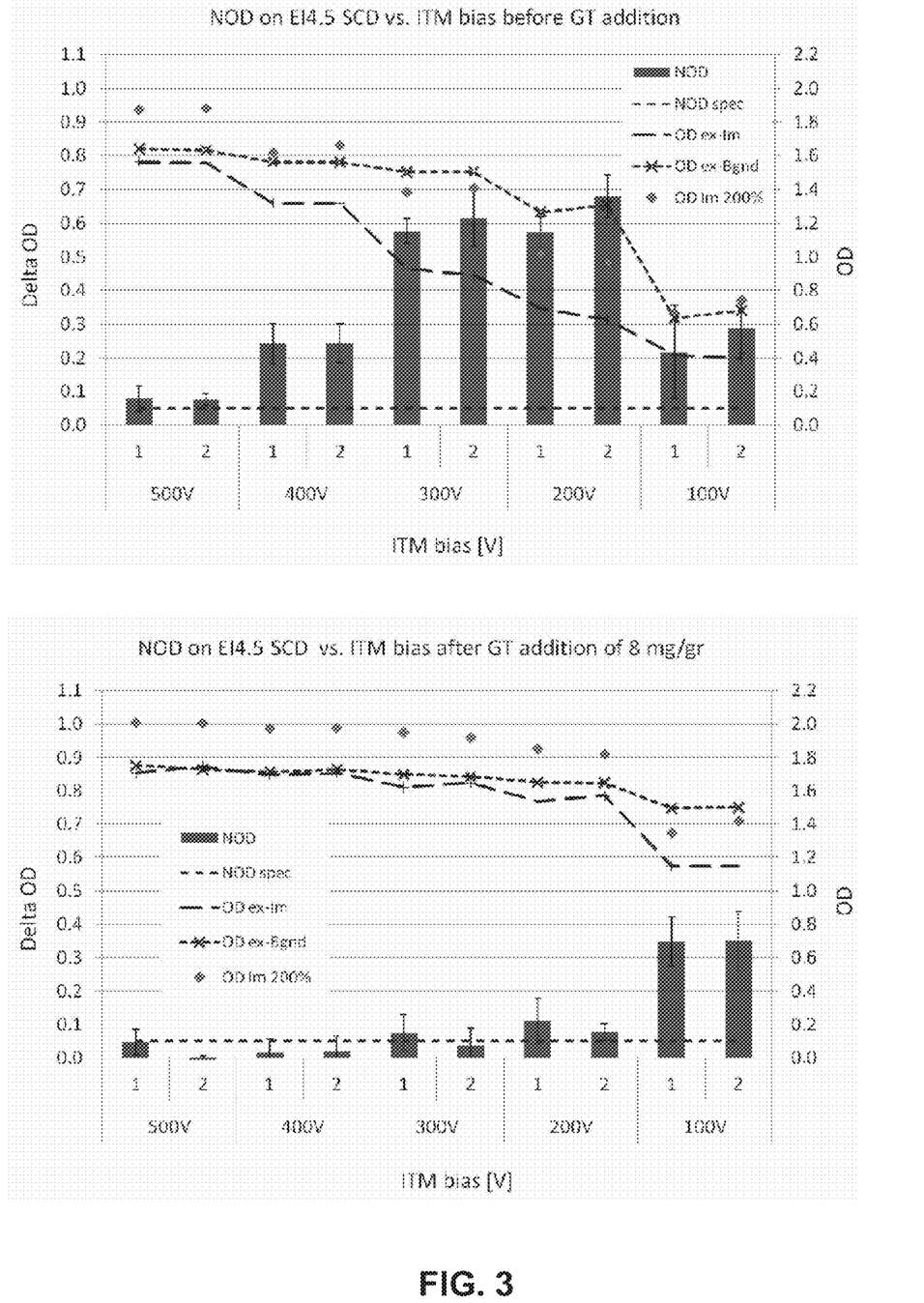

The results shown in FIG. 3 are labeled as follows. OD ex-Im is the optical density of the black patch on the paper (last 10 prints) in a location corresponding to a region of the blanket previously covered by one of the small cubes; OD ex-Bgnd is the optical density of the black patch on the paper corresponding to a background region of the blanket during the cube printing run; OD Im 200% is the optical density of a small cube (made of 100% black and 100% cyan) on the last print of the cube job; NOD is the difference between OD ex-Bgnd and OD ex-Im i.e. it is the difference in optical density on the paper between regions that were background and regions that were images in the previous prints of the cube job; and NOD spec is a threshold level of the NOD where artifacts caused by NOD become visible and start to visibly damage subsequent prints.

The x-axis of each of the panes show the repetition number (each experiment was repeated twice in order to assess the noise between configurations) in addition to the Intermediate Transfer Member (ITM) bias voltage. It will be immediately apparent from FIG. 3 that for the ink without the charge control agent, high bias voltages (~500 V) must be used to avoid the build-up of a NOD signal, whereas the addition of 0.8 g GT to the ink the build-up of such a signal can be avoided at a bias voltage as small as around 200 V.

EXPERIMENTAL EXAMPLE 3

In this experiment, the same experimental setup as used in experimental example 2 was used with the difference that a different type of electrostatic ink was used (black Coral Rev0 ink), which is a liquid electrophotographic ink having a carrier fluid, a pigment, a high melt viscosity ethylene acrylic acid copolymer resin having an acid content of at least 15 wt % and a viscosity of at least 8,000 poise, with the ink having a total resin acidity of at least 15 wt % and a total resin melt viscosity of at least 20,000 poise charged with the SCD of Experimental example 1.

Such an ink may for instance be obtained by mixing a high melt viscosity ethelyne acrylic acid copolymer resin (700 g of Nucrel® 925 by Du Pont™ Co.), a high acid ethylene acrylic acid copolymer resin (300 g of Nucrel® 2806 by Du Pont™ Co.) and isoparaffin (1500 g of Isopar L® by Exxon Mobile Corp.) in a double planetary mixer at a ratio of the high melt viscosity ethelyne acrylic acid copolymer resin to the high acid ethylene acrylic acid copolymer resin of 70/30 w/w respectively to provide about 40 wt % non-volatile solids. The paste is heated to a temperature of 130° C. during mixing and cooled to room temperature (approx. 22° C.) over a period of 3 hours, and subsequently combined with 79 g. of a suitable black pigment, 19 g. of polyethylene wax, 6 g. of charge adjuvant and 1426 g. of Isopar L® in an attritor. The mixture was grinded for 1.5 hours at 50° C. (hot stage) followed by 10.5 hours at 37° C. (cold stage) at 250 rpm to obtain the ink.

Figure 4:
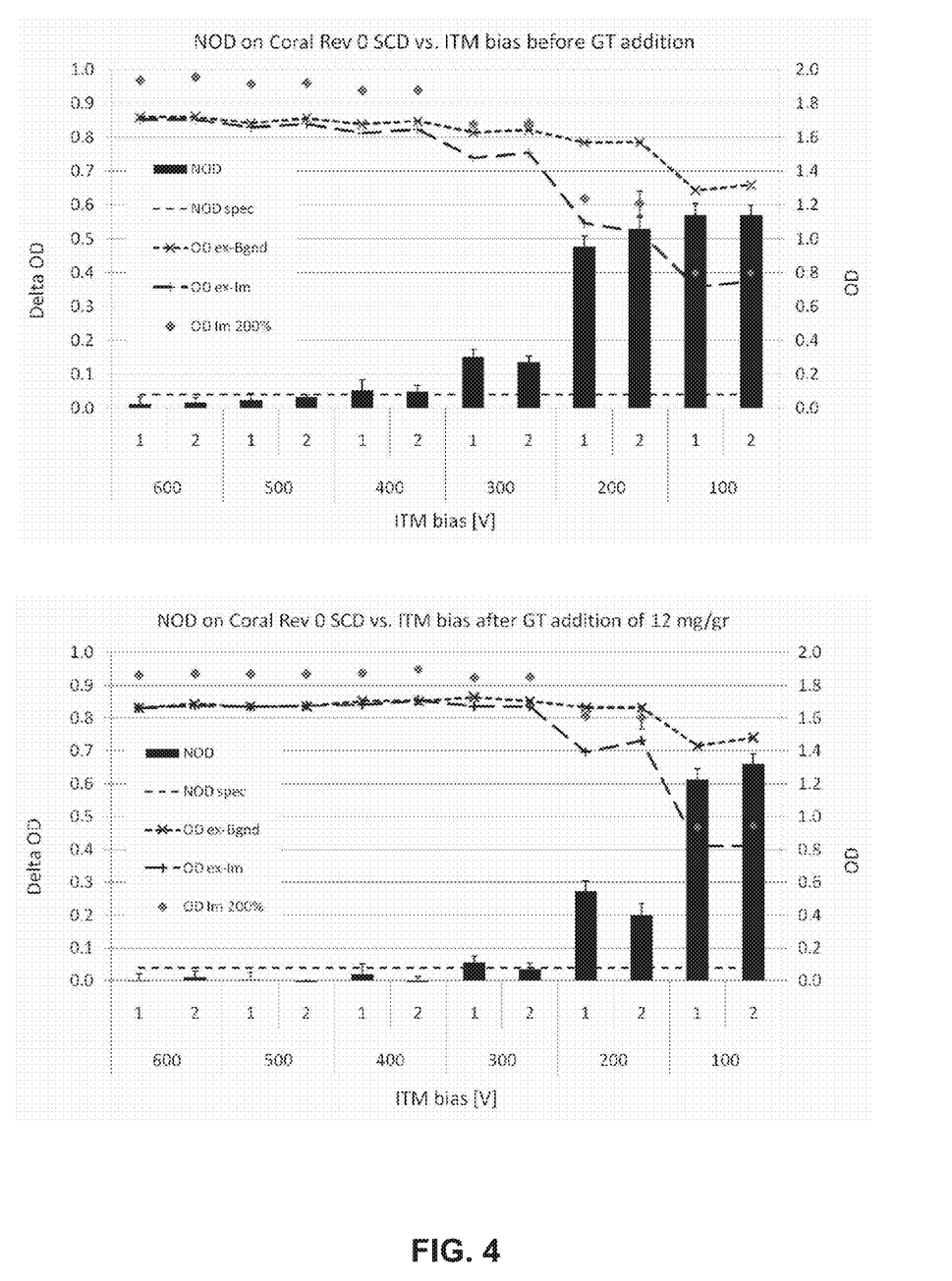
Figure 5:
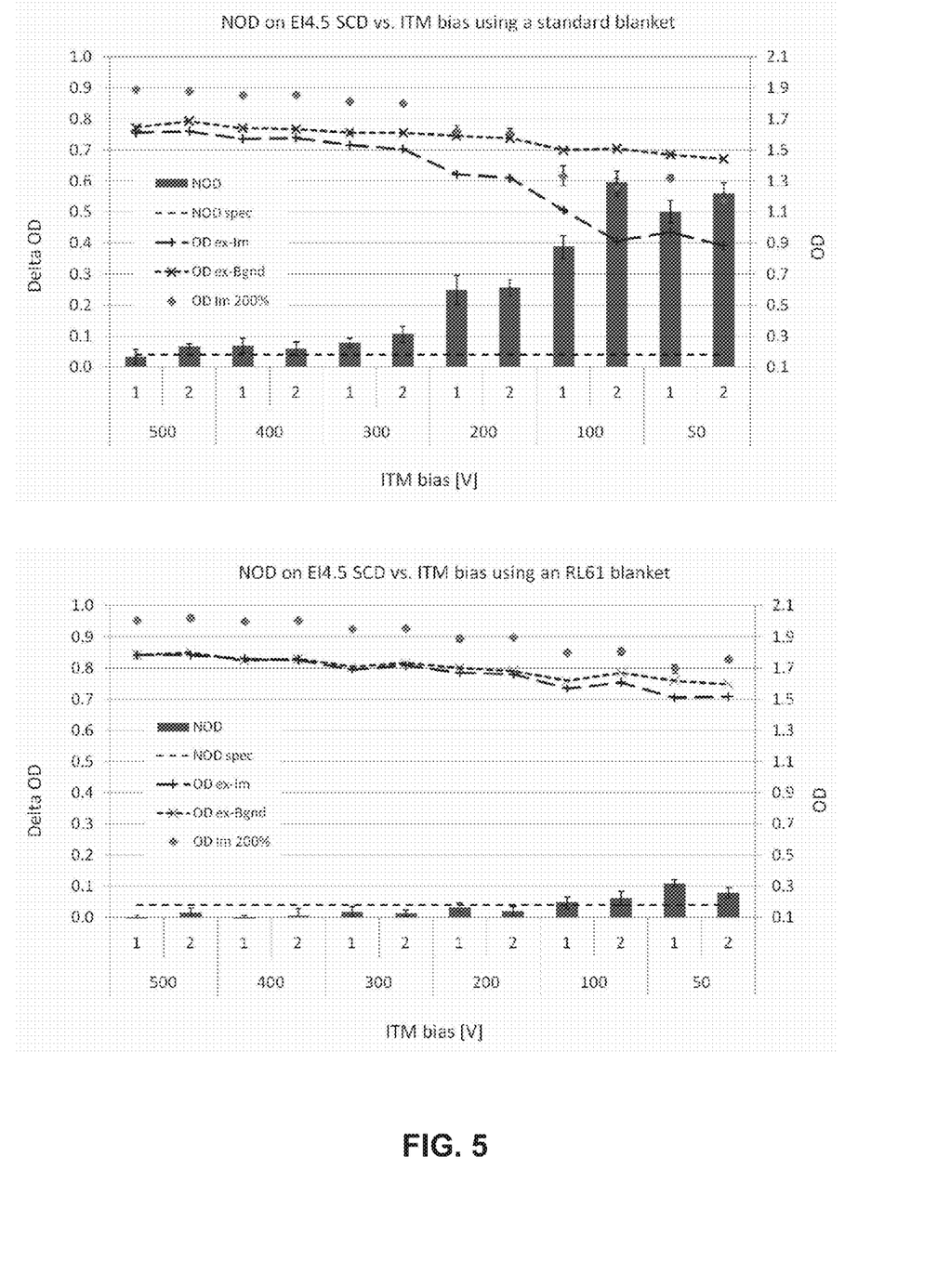

The effect of the addition of GT on the required bias voltage for the blanket of the intermediate transfer member 124 has been investigated. The results are shown in FIG. 4. The curves in FIG. 5 are labeled in the same manner as previously described for FIG. 3. The top pane shows the detected NOD signal for the ink without GT at different bias voltages of the blanket, whereas the bottom pane shows the detected NOD signal for the ink to which 1.2 g GT corresponding to 12 mg/g toner particles has been added. Although less pronounced than in the experimental example 2, it is nevertheless clear that the addition of GT to this ink significantly reduces the NOD signal and allows for the operation of the blanket of the intermediate transfer member 124 at a lower bias voltage, i.e. approximately 100 V lower as can be derived from FIG. 4.

Such experiments were repeated in the context of larger integration tests including different types of printed jobs (customer and synthetic) and monitoring a variety of parameters besides NOD. During those experiments, with Coral Rev0 YMCK charged with SCD and an average amount of 7 mg GT per gram toner particles, no NOD signal was observed (at 500V ITM bias) for hundreds of thousands impressions. During preliminary experiments with the same configuration but without GT, large NOD signals were observed.

EXPERIMENTAL EXAMPLE 4

In this experiment, the same experimental setup as used in experimental example 3 was used, with the difference that cyclohexyl amine dodecylbenzenesulfonate, propyl amine dodecylbenzenesulfonate, N-butyl amine dodecylbenzenesulfonate and D, L sec-butyl amine dodecylbenzenesulfonate were respectively used as charge control agents. It was found that all these compounds were successful in reducing NOD effects at a bias voltage of 500 V for the blanket whilst avoiding NOD memory effects. In addition, for propyl amine dodecylbenzenesulfonate, no NOD effects were observed for bias voltages as low as 200 V. For, N-butyl amine dodecylbenzenesulfonate no NOD effects were observed for bias voltages as low as 300 V, and the bias voltage could be further reduced to 200 V, whilst still producing reduced NOD effects. When the black Coral Rev0 charged with the SCD of Experimental example 1 was replaced by a cyan Coral Rev0 electroink charged with the SCD of Experimental example 1, no NOD effects were observed for bias voltages as low as 200 V with -butyl amine dodecylbenzenesulfonate as the charge control agent.

EXPERIMENTAL EXAMPLE 5

In this experiment, the same experimental setup as used in experimental example 2 was used for two different types of blankets, RL61™ and Gemini™, which are blankets having different release layer chemistries. The effect of the blanket on the prevention of NOD effects using GT as the charge control agent in black Coral Rev0 charged with SCD was investigated at different bias voltages of the blanket. The results are shown in FIG. 5, which are labeled in the same manner as previously described for FIG. 3. The top pane shows the results for the standard (Gemini) blanket and the bottom pane shows the results for the RL61 blanket. It will be immediately apparent that the RL61 blanket is less sensitive to NOD signal buildup as its bias voltage is shifted down by at least 300 V compared to the Gemini blanket. This experiment has been repeated for different ink formulations, which consistently show that the RL61 blanket is less susceptible to NOD signal buildup. This experiment shows that NOD effects originating from the blanket can also be reduced or prevented by optimization of the blanket material. Although this is useful for the development of future printing apparatuses, it is not practically, i.e. economically, feasible to replace the blankets of existing printing apparatuses with such optimized blankets.

Finally, it is noted that the electrostatic ink composition of embodiments of the present invention may be made available in any suitable container, e.g. a cartridge or flask.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. Electrostatic ink composition comprising:

a carrier liquid;

toner particles;

a charge director comprising nanoparticles of a first salt and micelles of formula $MA_n$ enclosing said nanoparticles, wherein M is a metal, n is the valence of M and A is an organic ion; and a charge control agent according to Formula 1:

Formula 1 wherein $R_1$ is a branched or unbranched $C_4$-$C_{18}$ alkyl group, $R_2$ is a cyclic, branched or unbranched $C_3$-$C_8$ alkyl group and $R_3$-$R_4$ are selected from hydrogen and a cyclic, branched or unbranched $C_3$-$C_8$ alkyl group.

2. The electrostatic ink composition of claim 1, wherein the organic ion is an ion according to Formula 2:

$$R_1—O—C(O)CH_2CH(SO_3^-)C(O)—O—R_2 \quad \text{Formula 2}$$

wherein in Formula 2 each of $R_1$ and $R_2$ is a substituted or unsubstituted alkyl group.

3. The electrostatic ink composition of claim 2, wherein $R_1$ and $R_2$ in Formula 2 are individually selected from $C_6$-$C_{25}$ linear, branched or cyclic alkyl groups wherein the $C_6$-$C_{25}$ linear, branched or cyclic alkyl groups may be substituted with at least one functional group selected from F, Cl, Br, I, OH, $C_{1-6}$ alkoxy, $C_{1-6}$ alkyl sulfonate, $C_1$-$C_6$ fluorinated alkyl, $CF_3$ and $NO_2$.

4. The electrostatic ink of claim 2, wherein the substituted or unsubstituted alkyl group comprises a linear chain of at least 8 carbon atoms.

5. The electrostatic ink composition of claim 1, wherein at least one of $R_3$ and $R_4$ in Formula 1 is a cyclic, branched or unbranched $C_3$-$C_8$ alkyl group.

6. The electrostatic ink composition of claim 1, wherein $R_1$ in Formula 1 is a dodecyl group.

7. The electrostatic ink composition of claim 1, wherein $R_3$ and $R_4$ in Formula 1 are hydrogen groups and $R_2$ is selected from the list consisting of isopropyl, unbranched butyl, branched butyl and cyclohexyl groups.

8. The electrostatic ink composition of claim 5, wherein the charge control agent is a charge control agent according to Formula 3:

9. The electrostatic ink composition of claim 1, wherein the amount of charge control agent is in the range of 0.1-2% by total weight of the toner particles.

10. The electrostatic ink composition of claim 1, wherein M is selected from Na, K, Cs, Ca and Ba.

11. The electrostatic ink composition of claim 1, wherein the first salt has a cation selected from the group consisting of $Mg^{2+}$, $Ca^{2+}$, $Ba^{2+}$, $NH_4^+$, tert-butyl ammonium, $Li^+$, $Al^{3+}$ or any subgroup thereof, and an anion selected from the group consisting of $SO_4^{2-}$, $PO_4^{3-}$, $NO_3^-$, $HPO_4^{2-}$, $co_3^{2-}$, acetate, trifluoroacetate, $Cl^-$, $Br^-$, $I^-$, $ClO_4^-$ and $TiO_3^{4-}$ or from any sub-group thereof.

12. The electrostatic ink of claim 11, wherein the first salt is selected from the group consisting of $BaSO_4$ and $BaHPO_4$.

13. Ink container for insertion into a printing apparatus, said container comprising the electrostatic ink of claim 1.

14. Printing apparatus comprising the electrostatic ink of claim 1.

15. A method for obtaining a printed substrate, comprising:
  charging a first medium in a pattern according to an image;
  applying the electrostatic ink of claim 1 to said first medium such that said toner particles define said image;
  electrostatically transferring said image to an intermediate transfer member; and
  releasing the image from said intermediate transfer member onto the substrate.

* * * * *